United States Patent [19]

Baker

[11] Patent Number: 4,705,062

[45] Date of Patent: Nov. 10, 1987

[54] CHOKE AND IMPROVED NEEDLE TIP THEREFOR

[75] Inventor: Gerald S. Baker, Houston, Tex.

[73] Assignee: Cameron Iron Works, Inc., Houston, Tex.

[21] Appl. No.: 16,130

[22] Filed: Feb. 18, 1987

[51] Int. Cl.[4] .................... F16K 43/00; F16K 51/00
[52] U.S. Cl. .................. 137/315; 251/122; 251/333; 251/357; 251/368; 166/91
[58] Field of Search .............. 137/315; 251/121, 122, 251/333, 357, 360, 362, 368; 166/91; 175/38, 218

[56] References Cited

U.S. PATENT DOCUMENTS

| | | | |
|---|---|---|---|
| 852,644 | 5/1907 | Bacon | 251/366 |
| 1,696,876 | 12/1928 | Bacon | 251/366 |
| 2,014,314 | 9/1935 | Defenbaugh | 251/122 |
| 2,091,874 | 8/1937 | Neuhaus | 251/333 |
| 2,194,961 | 3/1940 | Walker | 251/357 |
| 2,285,343 | 6/1942 | Marchand, Jr. et al. | 251/357 |
| 3,262,673 | 7/1966 | Seeley | 251/357 |
| 3,462,121 | 8/1969 | Smull | 251/357 |
| 3,815,873 | 6/1974 | Hendrich | 251/357 |
| 4,337,788 | 7/1982 | Seger | 251/122 |
| 4,337,920 | 7/1982 | Parris | 251/357 |

*Primary Examiner*—George L. Walton
*Attorney, Agent, or Firm*—Vinson & Elkins

[57] ABSTRACT

The improved choke includes a body with an internal valve chamber, an inlet and an outlet communicating through the body into the valve chamber, a valve seat surrounding the opening of the outlet into the valve chamber, and a valve member mounted within said body to move toward and away from said valve seat to control flow therethrough, means for moving the valve member in said body, the valve member having a stem and a replaceable, wear-resistant tip which is provided with a sleeve insert secured within the stem opening and having internal threads which mate with external threads on the end of the stem, the tip recess includes a groove into which a portion of the sleeve insert is swaged to secure it tightly into the tip.

12 Claims, 4 Drawing Figures

CHOKE AND IMPROVED NEEDLE TIP THEREFOR

BACKGROUND

Chokes are used in flow lines to create a restriction in the flow. In many applications of chokes, the high velocity flow or the entrained moisture or particles are particularly damaging to the tip of the choke valve member. In such applications, the tip is made of an erosion resistant material, such as tungsten carbide. Rather than make the whole of the needle or valve member out of the erosion resistant material, the tips are made to be replaced.

Prior to the present invention, such tips have been silver brazed onto the needle stem. Few are qualified to perform this silver brazing so that it is difficult to replace a tip and have it properly installed.

Threading of the tungsten carbide tip would be advantageous except that forming threads in tungsten carbide is an expensive operation.

U.S. Pat. No. 852,644 discloses a refractory stopper which includes internal threads and a nut embedded in the stopper through which the threads extend so that the stopper can be threaded onto the stem.

U.S. Pat. No. 1,499,433 discloses a throttle valve in which the tip is attached to the stem with a ring positioned in a groove in the stem and a plug threaded into the tip and engaging the ring to thereby secure the tip to the stem.

U.S. Pat. No. 1,831,713 discloses a choke or adjustable flow bean in which the tip is threaded onto the stem into abutment with disc which is secured to the stem with a set screw being used to prevent the unthreading of the tip from the head.

U.S. Pat. No. 1,911,905 discloses a choke or adjustable flow bean in which the tip is secured to the stem by a pin extending through the stem and through the outer portion of the tip which surrounds the stem and through the stem.

U.S. Pat. No. 3,262,673 discloses another stopper structure which includes a split sleeve positioned in a stem groove and having external threads which are adapted to engage within internal threads in the stem opening in the stopper.

U.S. Pat. No. 3,693,732 discloses a well control choke in which the stem is surrounded by a sleeve which receives a plug in an enlarged recess in its outer end which extends beyond the end of the stem and is held in position by the threading of the plug onto the end of the stem.

U.S. Pat. No. 3,761,053 discloses a needle valve in which the needle is replaceable and is provided with a spherical end which is received within a slot in the stem or is secured by a collar retaining it against the end of the stem.

U.S. Pat. No. 4,337,920 discloses another method of securing a wear-resistant, sleeve-type valve member to its stem in a choke which is subject to high temperatures and extreme erosion conditions. This includes the utilization of annular springs positioned around the stem and within the wear-resistant sleeve.

SUMMARY

The present invention relates to an improved choke with an improved wear resistant tip which is easily and quickly fastened to the choke stem. The improved choke includes a body with an internal valve chamber, an inlet and an outlet communicating through the body into the valve chamber, a valve seat surrounding the opening of the outlet into the valve chamber, and a valve member mounted within said body to move toward and away from said valve seat to control flow therethrough, means for moving the valve member in said body, the valve member having a stem and a replaceable, wear-resistant tip which is provided with a sleeve insert secured within the stem opening and having internal threads which mate with external threads on the end of the stem, the tip recess includes a groove into which a portion of the sleeve insert is swaged to secure it tightly into the tip.

An object of the present invention is to provide an improved choke in which a worn, wear-resistant valve member tip is easily and quickly replaceable.

Another object is to provide an improved choke in which a worn valve member tip of wear-resistant material may be replaced with another wear-resistant valve member tip which has a relatively inexpensive and simple means for securing it to the valve stem.

Still another object is to provide an improved replaceable, wear-resistant tip for a choke which is readily removed and replaced and has a reliable and inexpensive means for securing it to the end of the valve stem.

BRIEF DESCRIPTION OF THE DRAWINGS

These and other objects and advantages are hereinafter set forth and explained with respect to the drawings wherein.

DESCRIPTION OF THE PREFERRED EMBODIMENTS

Figure 1:
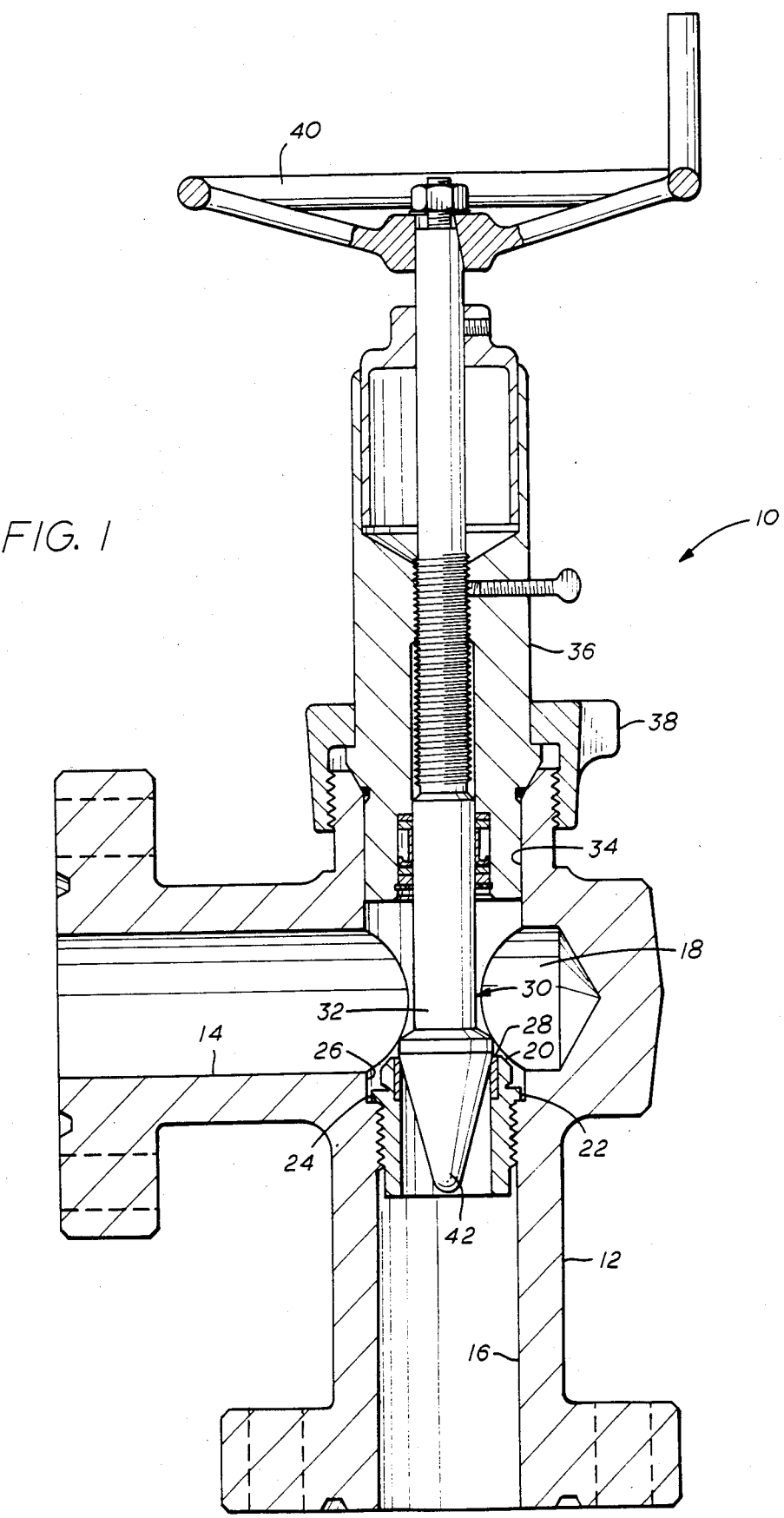
FIG. 1 is a sectional view of the improved choke of the present invention.

Improved choke 10 of the present invention is illustrated in FIG. 1 and includes body 12 with inlet 14 and outlet 16 communicating through body 12 into interior valve chamber 18. Valve seat 20 is positioned within valve chamber 18 in position surrounding the opening of outlet 16 into valve chamber 18. Valve seat 20 is suitably secured as by threading within outlet 16 and includes flange 22 which engages surface 24 of counterbore 26 in the opening of outlet 16 into valve chamber 18 and wear-resistant seat insert 28.

Valve member 30 includes stem 32 extending through opening 34 in body 12 and through sleeve 36 which is secured therein by clamp ring 38. The portion of stem 32 within sleeve 36 is threaded into the threads on the interior of sleeve 36 and is moved by handwheel 40 rotating stem 32 and because of its threaded engagement within sleeve 36 causes valve member 30 to move toward and away from valve seat 20 to control flow therethrough. Tip 42 is secured to the inner end of valve member 30.

Figure 3:
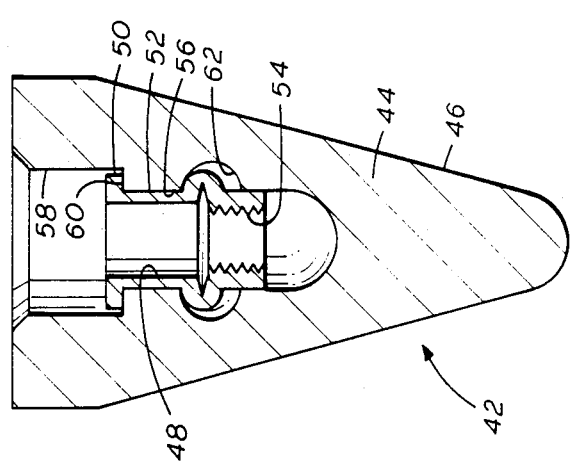
FIG. 3 is a sectional view of the improved tip with its sleeve insert secured therein.
Figure 2:
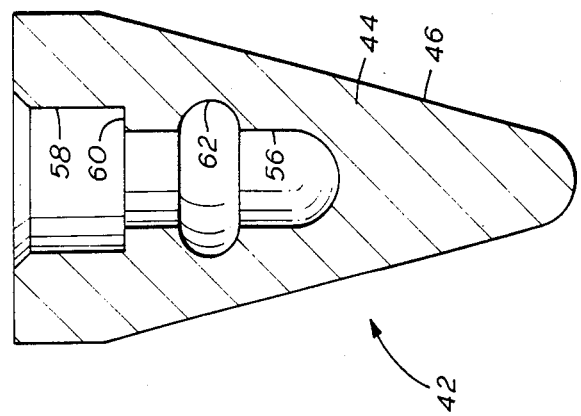
FIG. 2 is a sectional view of the improved replaceable wear-resistant tip of the present invention.

Tip 42 is a wear-resistant replaceable unit and, as shown in FIG. 2, includes body 44 which has a tapered conical surface 46 to coact with valve seat insert 28. A suitable material for tip 42 is tungsten carbide. A means is provided for securing tip 42 onto the threaded end of stem 32. Such securing means includes sleeve 48 which has outer flange 50, shank portion 52 and internal threads 54. Tip body 44 includes bore 56 in its end opposite surface 46 with counterbore 58 to provide surface 60 surrounding bore 56. Groove 62 is provided in the interior of bore 56. Sleeve 48 is positioned within bore 56 with flange 50 in engagement with surface 60. Shank portion 52 is swaged into groove 62 to secure sleeve 48 in its position as shown in FIG. 3.

Figure 4:
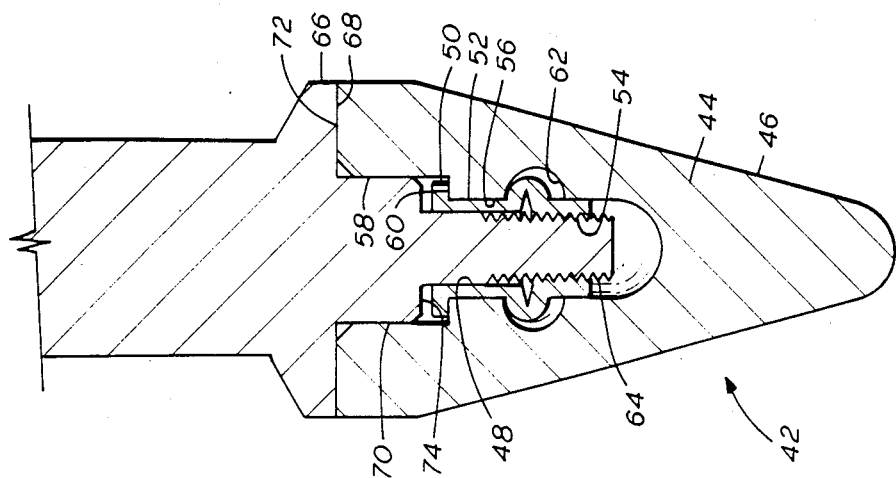
FIG. 4 is a sectional view of the improved tip secured onto the threaded end of the stem.

Such securing means provides the securing of tip 42 on stem 32 by threading threaded pin 64 of stem 32 into sleeve threads 54. The end of stem 32 includes radial flange 66 providing annular surface 68 surrounding reduced portion 70 of stem 32 which fits into counterbore 58 as shown in FIG. 4. Pin 64 which extends beyond portion 70 is threaded into threads 54 of sleeve 48. Assembly of tip body 44 onto stem 32 is complete when flange surface 68 of stem 32 engages end surface 72 of tip body 44. In this position shoulder 74 between pin 64 and reduced portion 70 is positioned a slight distance from engagement with flange 50 of sleeve 48.

It is preferred that sleeve 48 be a product as described above and as provided by the B. F. Goodrich Company under the trademark "Rivut." The material of sleeve 48 should be selected to withstand the conditions to be encountered within choke 10. Generally, the material of sleeve 48 would preferably be stainless steel.

With the improved tip of the present invention, sleeve 48 can be assembled within tip body 44 at the factory and shipped to a customer's location for use as a replacement of a worn or damaged tip at the point of usage so that it is only necessary to shut down the system and bleed the pressure from choke 10 to disassemble the components and replace the used tip body with a new tip body. No silver brazing or complex assembly is required for this replacement. Also, the improved tip is relatively simple to construct and does not involve the expensive process of having to form internal threads within the tungsten carbide tip.

What is claimed is:

1. A choke comprising
a body having an internal valve chamber with an inlet and an outlet communicating through the body into the valve chamber,
a seat positioned within said valve chamber surrounding the opening of the outlet into the valve chamber,
a valve member positioned within said valve chamber and including a stem and a replaceable wear-resistant tip,
means connected to said stem to move said stem and said tip toward and away from said seat to control flow therethrough,
said stem being threaded on its end for fastening to said tip,
said tip having an internal cylindrical recess with an annular groove in the surface of said recess, and
a sleeve slidably inserted into said recess and having internal threads mating with the threads on the stem and having a shank, a portion of which is swaged into the groove in said recess to secure said sleeve insert within said recess and the remaining portion of the shank being postioned in said recess.

2. A choke according to claim 1 wherein
said wear-resistant tip is tungsten carbide.

3. A choke according to claim 1 wherein
said sleeve insert includes an outwardly extending flange positioned against the surface surrounding the tip recess.

4. A choke according to claim 1 wherein
said stem includes a radial flange surrounding the threaded end to provide a radially extending annular surface for engaging the surface of said tip surrounding the internal cylindrical recess therein.

5. A choke according to claim 1 wherein
said sleeve insert is stainless steel.

6. A choke according to claim 1 wherein
said sleeve insert includes internal threads extending from one end thereof to a shank portion of said insert and a radially extending flange on the end of the shank portion opposite said threaded portion,
a counterbore into said tip to provide a radial surface surrounding said bore,
said sleeve flange engaging said radial surface surrounding said bore.

7. A replaceable choke tip comprising
a tip body having an exterior surface adapted to coact to control flow through a choke, a bore extending into the interior of the tip body from the end of the tip body opposite to said exterior surface and a groove in said bore space inwardly from the end of the tip body, and
a sleeve slidably inserted into said bore and having internal threads and having a portion of its exterior swaged into said groove to secure said sleeve within said bore and the remaining portion of its exterior being positioned in said bore.

8. A replaceable choke tip according to claim 7 wherein
said tip body is a wear-resistant material.

9. A replaceable choke tip according to claim 7 wherein
said tip body is tungsten carbide.

10. A replaceable choke tip according to claim 7 wherein
said body includes a counterbore into the tip body around said bore to provide a surface surrounding said bore,
said sleeve includes an outwardly extending flange positioned against said surface surrounding said bore.

11. A replaceable choke tip according to claim 7 wherein
said internal threads being selected to mate with threads on a stem on which the tip is to be installed.

12. A replaceable choke tip according to claim 7 wherein
said sleeve is stainless steel.

* * * * *